US009811899B2

(12) United States Patent
Chien et al.

(10) Patent No.: US 9,811,899 B2
(45) Date of Patent: Nov. 7, 2017

(54) METHOD, IMAGE PROCESSING SYSTEM AND COMPUTER-READABLE RECORDING MEDIUM FOR ITEM DEFECT INSPECTION

(71) Applicant: Powerchip Technology Corporation, Hsinchu (TW)

(72) Inventors: Hao-Yu Chien, Taoyuan (TW); Chan-Hao Hsu, Hsinchu (TW); Tzung-Hua Ying, Hsinchu (TW)

(73) Assignee: Powerchip Technology Corporation, Hsinchu (TW)

( * ) Notice: Subject to any disclaimer, the term of this patent is extended or adjusted under 35 U.S.C. 154(b) by 12 days.

(21) Appl. No.: 15/099,609

(22) Filed: Apr. 15, 2016

(65) Prior Publication Data

US 2017/0186144 A1   Jun. 29, 2017

(30) Foreign Application Priority Data

Dec. 28, 2015 (TW) .............................. 104143977 A (51) Int. Cl.
G06T 7/00 (2017.01)
G06T 5/00 (2006.01)
G06T 5/50 (2006.01)

(52) U.S. Cl.
CPC .............. *G06T 7/001* (2013.01); *G06T 5/002* (2013.01); *G06T 5/50* (2013.01); *G06T 7/0008* (2013.01);

(Continued)

(58) Field of Classification Search
CPC ........................................ G06T 7/0002–7/001
See application file for complete search history.

(56) References Cited

U.S. PATENT DOCUMENTS 6,330,353 B1* 12/2001 Lai ....................... G06K 9/6203
382/147
2003/0152275 A1* 8/2003 Chung .................... G06T 7/001
382/218

(Continued)

FOREIGN PATENT DOCUMENTS

CN 102411775 4/2012
JP 2001194323 7/2001

(Continued)

OTHER PUBLICATIONS

"Office Action of Taiwan Counterpart Application", dated Oct. 21, 2016, p.1-p.3, in which the listed references were cited.

*Primary Examiner* — Sean Motsinger
(74) *Attorney, Agent, or Firm* — JCIPRNET (57) ABSTRACT

A method, image processing system, and computer-readable recording medium for item defect inspection are provided. The method is as follows. A test image and a reference image of a test item are received. A test block and a corresponding reference block are obtained from the test image and the reference image to generate a test block image and a reference block image. The test block image and the reference block image are respectively partitioned into multiple sub-blocks. All interfering sub-blocks are identified and filtered out from the test block image and the reference block image, and a shift calibration parameter is obtained accordingly. The test block in the test image is calibrated based on the shift calibration parameter to generate a calibrated test block image. The calibrated test block image and the reference block image are compared to obtain defect information of the test item corresponding to the test block.

20 Claims, 7 Drawing Sheets

(52) U.S. Cl.
CPC ............ *G06T 2207/10024* (2013.01); *G06T 2207/20021* (2013.01); *G06T 2207/20024* (2013.01); *G06T 2207/20072* (2013.01); *G06T 2207/30148* (2013.01)

(56) References Cited

U.S. PATENT DOCUMENTS

| | | | |
|---|---|---|---|
| 2003/0179921 A1* | 9/2003 | Sakai .................... G06T 7/0002 | 382/151 |
| 2003/0185462 A1* | 10/2003 | Hsieh .................... G06K 9/6203 | 382/286 |
| 2004/0109601 A1* | 6/2004 | Pang ........................ G03F 1/84 | 382/149 |
| 2004/0146295 A1* | 7/2004 | Furman .............. G01N 21/8806 | 398/9 |
| 2004/0264759 A1* | 12/2004 | Hattori ...................... G06T 7/32 | 382/145 |
| 2007/0053582 A1* | 3/2007 | Yamashita ....... G01N 21/95607 | 382/151 |
| 2012/0076410 A1* | 3/2012 | Sonoura .............. G01N 21/956 | 382/173 |
| 2013/0082177 A1* | 4/2013 | Hiroi .................. G01N 23/2251 | 250/310 |
| 2013/0343632 A1* | 12/2013 | Urano ..................... G06T 7/001 | 382/149 |
| 2014/0055774 A1* | 2/2014 | Sugihara ............ G01N 21/9501 | 356/51 |
| 2014/0205180 A1* | 7/2014 | Chung .................. G06T 7/0006 | 382/149 |
| 2014/0348414 A1* | 11/2014 | Hashimoto ............. G06T 7/001 | 382/144 |
| 2015/0003721 A1* | 1/2015 | Pettibone ................ G06T 7/001 | 382/149 |
| 2015/0054940 A1* | 2/2015 | Shi ......................... G06T 7/001 | 348/87 |
| 2017/0069111 A1* | 3/2017 | Inoue ...................... G06T 7/001 | |
| 2017/0122890 A1* | 5/2017 | Inoue ................. G01N 23/2251 | |
| 2017/0132772 A1* | 5/2017 | Ogawa ............... G01N 21/9505 | |

FOREIGN PATENT DOCUMENTS

| | | |
|---|---|---|
| TW | 201423090 | 6/2014 |
| TW | 201430336 | 8/2014 |

* cited by examiner

METHOD, IMAGE PROCESSING SYSTEM AND COMPUTER-READABLE RECORDING MEDIUM FOR ITEM DEFECT INSPECTION

CROSS-REFERENCE TO RELATED APPLICATION

This application claims the priority benefit of Taiwan application serial no. 104143977, filed on Dec. 28, 2015. The entirety of the above-mentioned patent application is hereby incorporated by reference herein and made a part of this specification.

TECHNICAL FIELD

The disclosure relates to an item defect inspection technique.

BACKGROUND

Computer vision and image recognition have been extensively applied in industrial production and traditional manufacture for automatic and refinement purposes. Through such image processing techniques, effective quality control would be attained and thereby improve manufacture processes as well as reduce manufacture costs.

For example, during a wafer manufacturing process, defects could occur on wafer surfaces due to equipments, environment, and human causes. Currently, wafer surface defects are mainly inspected through comparing features within an image of a wafer surface captured by an image capturing device and each block in its reference image, and all defect information on the wafer surface could be thereby obtained. The existing approaches for defect inspection are mainly done by subtracting two images with corresponding blocks to obtain a difference image and determining whether each pixel value of the difference image is greater than a preset threshold. However, when color cast, color shift, uneven brightness, or noise interference occurs in a captured image, false defects would be detected after the captured image is compared with its reference image. This would result in an inaccurate image alignment for comparison.

SUMMARY OF THE DISCLOSURE

Accordingly, the disclosure is directed to a method, an image processing system, and a computer-readable recording medium for item defect inspection that reduces the probability of a false alarm on item defect inspection through image pre-processing.

An item defect inspection method adapted to an image processing system is provided in the disclosure, where the method includes the following steps. First, a test image and a reference image of a test item are received. Next, a test block is obtained from the test image, and a reference block corresponding to the test block is obtained from the reference image to respectively generate a test block image and a reference block image. The test block image and the reference block image respectively partitioned into a plurality of test sub-blocks and a plurality of reference sub-blocks, where each of the test sub-blocks corresponds to each of the reference sub-block. The test sub-blocks and the reference sub-blocks are compared so as to identify any interfering test sub-bock and any interfering reference sub-block respectively from the test sub-blocks and the reference sub-blocks, where each of the interfering test sub-blocks is not similar to any of the interfering reference sub-blocks, and each of the interfering reference sub-blocks is not similar to any of the interfering test sub-blocks. Next, the interfering test sub-blocks and the test sub-blocks corresponding to the interfering reference sub-blocks are filtered out from the test block image to generate a filtered test block image, and the interfering reference sub-blocks and the reference sub-blocks corresponding to the interfering test sub-blocks are filtered out from the reference block image to generate a filtered reference block image. A shift calibration parameter is obtained according to the filtered test block image and the filtered reference block image, and the test block in the test image is calibrated according to the shift calibration parameter to obtain a calibrated test block image. The calibrated test block image and the reference block image are compared to obtain defect information of the test item corresponding to the test block.

An image processing system including a storage device and a processor is provided in the disclosure, where the processor is coupled to the storage device. The storage device is configured to record modules. The processor is configured to access and execute the modules recorded in the storage device. The modules include an image receiving module, a block sampling module, a block comparing module, a block filtering module, an image calibrating module, and a defect inspecting module. The image receiving module is configured to receive a test image and a reference image of a test item. The block sampling module is configured to obtain a test block from the test image and obtain a reference block corresponding to the test block from the reference image to respectively generate a test block image and a reference block image. The block comparing module is configured to partition the test block image and the reference block image respectively into a plurality of test sub-blocks and a plurality of reference sub-blocks, and compare the test sub-blocks and the reference sub-blocks so as to identify any interfering test sub-bock and any interfering reference sub-block respectively from the test sub-blocks and the reference sub-blocks, where each of the test sub-blocks corresponds to each of the reference sub-block, each of the interfering test sub-blocks is not similar to any of the interfering reference sub-blocks, and each of the interfering reference sub-blocks is not similar to any of the interfering test sub-blocks. The block filtering module is configured to filter out the interfering test sub-blocks and the test sub-blocks corresponding to the interfering reference sub-blocks from the test block image to generate a filtered test block image, and filter out the interfering reference sub-blocks and the reference sub-blocks corresponding to the interfering test sub-blocks from the reference block image to generate a filtered reference block image. The image calibrating module is configured to obtain a shift calibration parameter according to the filtered test block image and the filtered reference block image, and calibrate the test block in the test image according to the shift calibration parameter to obtain a calibrated test block image. The defect inspecting module is configured to compare the calibrated test block image and the reference block image to obtain defect information of the test item corresponding to the test block.

A non-transitory computer-readable recording medium is also provided in the disclosure, where the computer-readable recording medium stores computer program to execute the aforementioned item defect inspection method.

In summary, a method, an image processing system, and a computer-readable recording medium for item defect inspection proposed in the disclosure would calibrate shifted test blocks in a test image before the test image is compared with its reference image so as to reduce the probability of a false alarm on item defect inspection.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
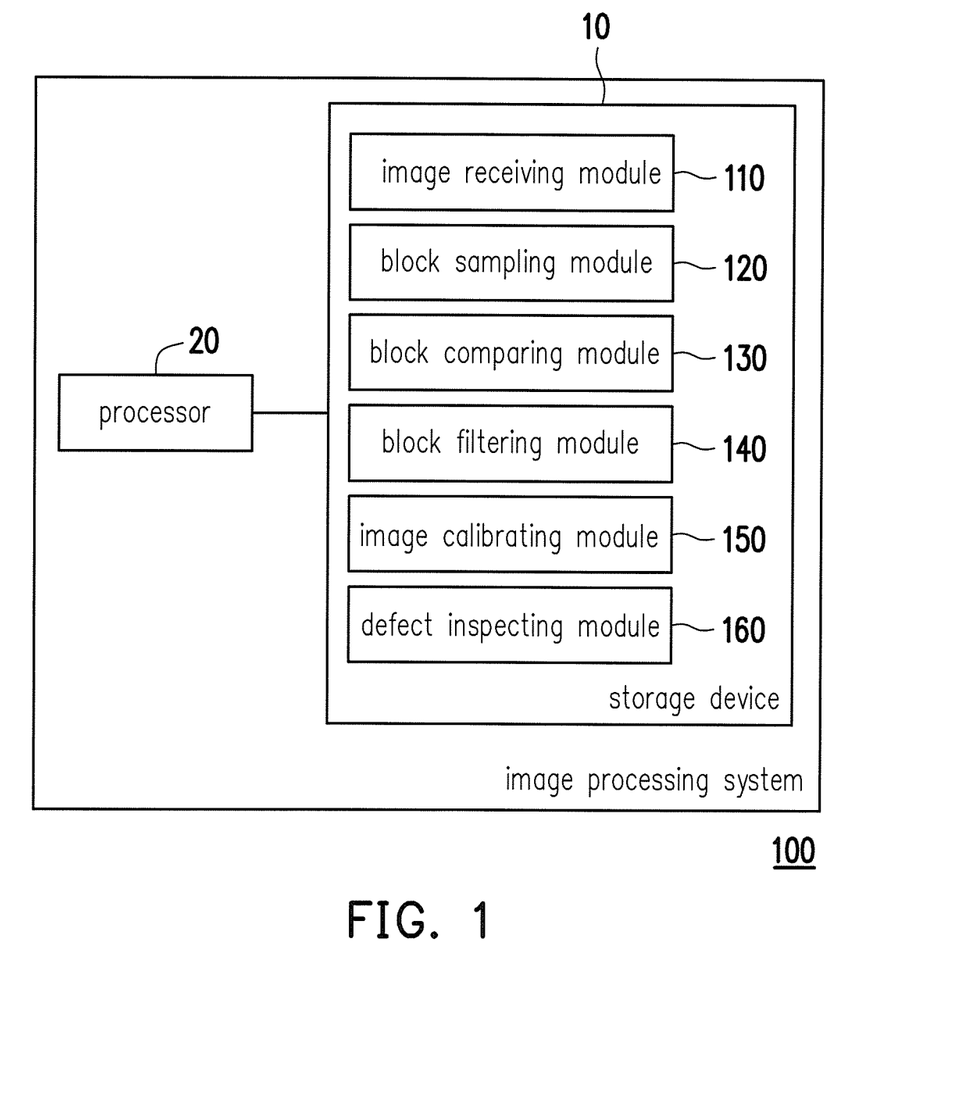
FIG. 1 illustrates a block diagram of an image processing system according to an embodiment of the disclosure.

FIG. 1 illustrates a block diagram of an image processing system according to an embodiment of the disclosure. It should, however, be noted that this is merely an illustrative example and the disclosure is not limited in this regard. All components of the image processing system and their configurations are first introduced in FIG. 1. The detailed functionalities of the components are disclosed along with FIG. 2.

Referring to FIG. 1, an image processing system 100 includes a storage device 10 and at least one processor 20. The image processing system 100 may be, for example, an electronic device with computational capabilities such as a personal computer, a laptop computer, a tabular computer, and a server computer, or an electronic device with image capturing and computational capabilities such as a digital camera, a scanner, and a smart phone. The disclosure is not limited in this regard.

The storage device 10 may be one or a combination of a stationary or mobile random access memory (RAM), a read-only memory (ROM), a flash memory, a hard drive or other similar devices. In the present embodiment, the storage device 10 is configured to record modules to be loaded and executed by the processor 20. The modules include an image receiving module 110, a block sampling module 120, a block comparing module 130, a block filtering module 140, an image calibrating module 150, and a defect inspecting module 160 and may be, for example, programs stored in the storage device 10 to be loaded into the processor 20 of the image processing system 100 for item defect inspection.

The processor 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 20 may access and execute the modules recorded in the storage device for item defect inspection.

It should be noted that, in other embodiments, the modules are not limited to be stored in the storage device 10. Those could also be entirely or partially implemented by hardware, software, firmware, or any combination thereof. For example, a hardware module could be coupled to another module by mechanical, electrical, optical, electromagnetic, or any physical connections. A software module could be coupled to another module by a function, procedure, method, subprogram, subroutine call, jump, link, parameter, variable, argument passing, function return, and so forth. A software module could be coupled to another module to receive variables, parameters, arguments, points, etc., and/or to generate or pass results, updated variables, pointers, and etc. A firmware module could be coupled to another module by any combination of hardware and software coupling methods above. A hardware, software, or firmware module could be coupled to any one of another hardware, software, or firmware module.

Figure 2:
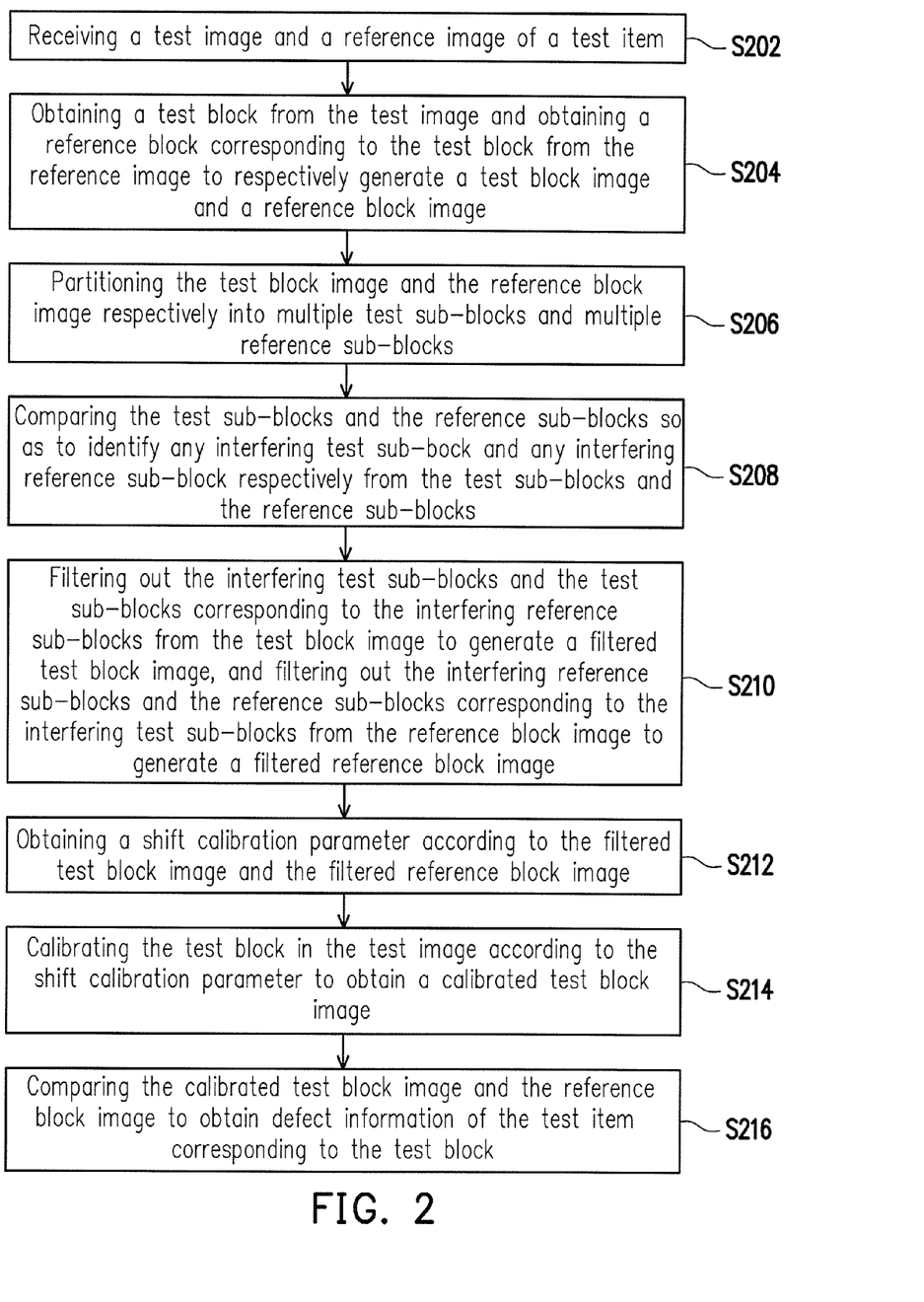
FIG. 2 illustrates a flowchart of an item defect inspection method according to an embodiment of the disclosure.

FIG. 2 illustrates a flowchart of an item defect inspection method according to an embodiment of the disclosure. The method in FIG. 2 may be implemented by each of the components of the image processing system 100 in FIG. 1. Defect inspection on wafer surfaces would be illustrated in the following embodiments. It should be noted that, the flow is also suitable defect inspection on other items or products. The disclosure is not limited herein.

Referring to both FIG. 1 and FIG. 2, the image receiving module 110 of the image processing system 100 would receive a test image and a reference image of a test item (Step S202). Herein, the test image is an image directly captured from the test item, and the reference image is an image of an item same as the test item but substantially with no defect. However, in other embodiments, the reference image could also be an image of the test item in another designated status to be provided to the test image for comparison. The disclosure is not limited in this regard.

In the present embodiment, the test image may be an image captured from a wafer to be tested, and the reference image is an image of a wafer substantially with no defect. The reference image could be pre-stored in the storage device 10. If the image processing system 100 is capable of capturing images, the image receiving module 110 would receive the test image captured by an image capturing module (not shown), and the other modules would continuously perform item defect inspection. If the image processing system 100 is not capable of capturing images, the image receiving module 110 would obtain the test image via wireless or wired transmission, and the other modules would continuously perform the item defect inspection.

In general, the existing techniques for inspecting wafer surface defects mainly involve iterating through each block in a test image and a reference image for comparison, and defect information on chips could be obtained according to differences determined through the comparison. However, when noise interference, such as color shift, or uneven brightness and color, occurs, the probability of a false alarm on wafer surface defects would increase. Hence, the image processing system 100 would first perform image calibration on the test image to eliminate the noise which possibly affects image feature comparison.

Herein, the image processing system 100 would first solve the problem of image shift. The block sampling module 120 would obtain a test block from the test image and obtain a reference block corresponding to the test block from the reference image (Step S204). To be specific, the block sampling module 120 would set one of the blocks obtained from the test image as the test block and select the block with a same image coordinate in the reference image as the reference block. Image processing would be performed on the test block and the reference block in the follow-up steps. An image of the test block and an image of the reference block are referred as "a test block image" and "a reference block image" hereinafter.

In an embodiment, the block sampling module 120 may set a predetermined region in the test image as a test region. Such test region could be a local region in which the noise normally occurs during the manufacturing process of the test item.

In another embodiment, the block sampling module 120 may calibrate the entire test image in a more efficient manner, where a to-be-calibrated region includes multiple to-be-calibrated test blocks. To be specific, FIG. 3A illustrates a flowchart of a method to define a to-be-calibrated region according to an embodiment of the disclosure.

Figure 3A:
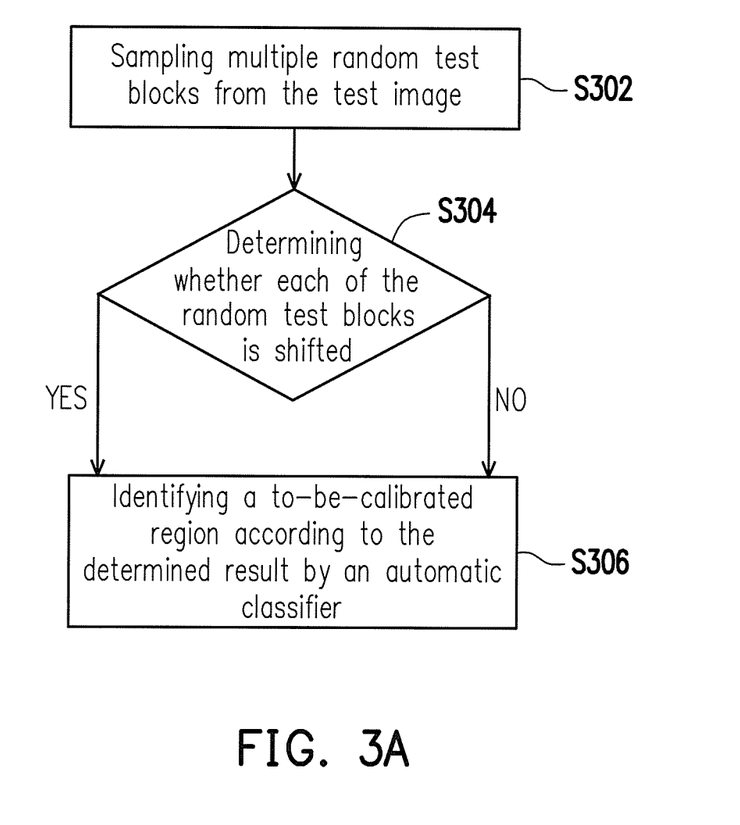
FIG. 3A illustrates a flowchart of a method to define a to-be-calibrated region according to an embodiment of the disclosure.

Referring to FIG. 3A, the block sampling module 120 would first sample multiple random test blocks from the test image (Step S302). Next, the block sampling module 120 would determine whether each of the random test blocks is shifted (Step S304), and the to-be-calibrated region including the to-be-tested blocks would be identified from the test image according to the determined result by an automatic classifier (Step S306). To be specific, the block sampling module 120 would first obtain blocks corresponding to each of the random test blocks (referred to as "random reference blocks" in herein) from the reference image, and determine whether each of the random test blocks is shifted according to image histograms of each of the random test blocks and its corresponding random reference block. Next, the block sampling module 120 would identify a shifted region and a non-shifted region from the test image by using an automatic classifier according to the determined result, where the shifted region is the to-be-calibrated region including multiple test blocks in the test image. Moreover, the block sampling module 120 may further store the determined result in a training database of the classifier to train the classifier.

A support vector machine (SVM) classifier for data clustering based on supervised learning is used in the present embodiment so as to divide the entire test image into the shifted region and the non-shifted region according to whether each of the random test blocks is shifted. Other classifiers could also be used for data clustering. The disclosure is not limited in this regard.

Figure 3B:
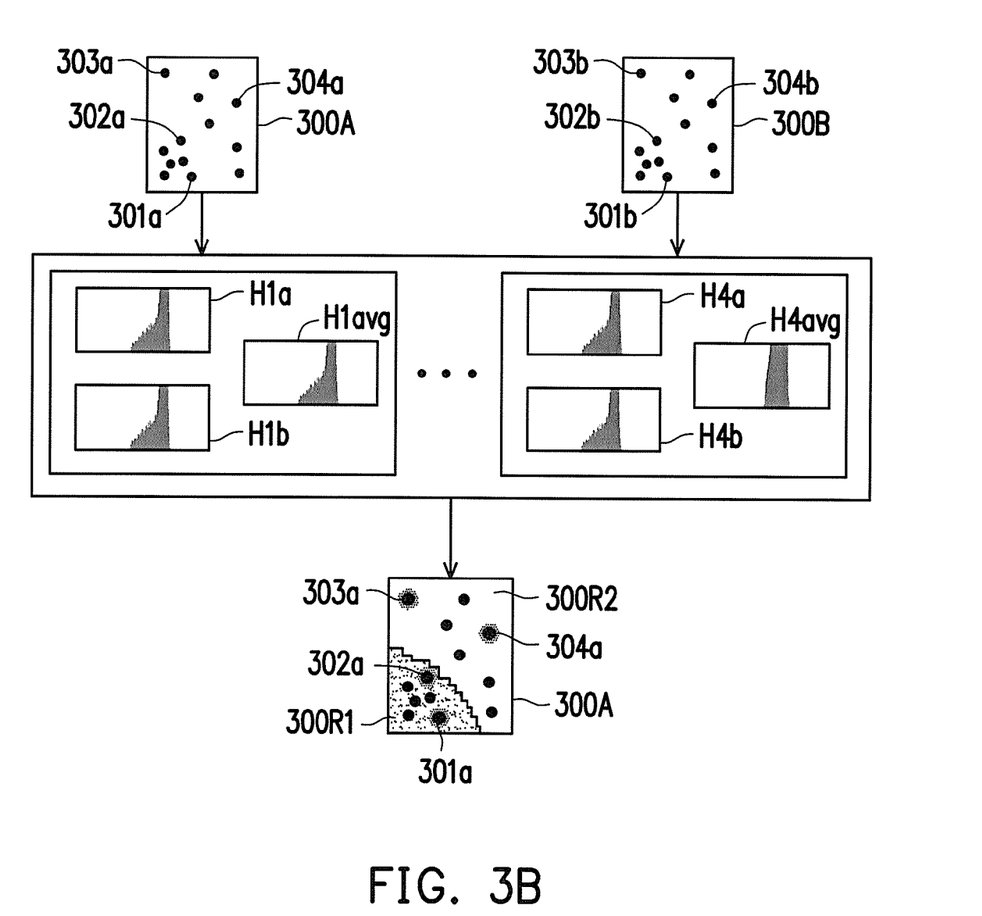
FIG. 3B illustrates a schematic diagram of a method to define a to-be-calibrated region according to an embodiment of the disclosure.

To be specific, FIG. 3B illustrates a schematic diagram of a method to define a to-be-calibrated region according to an embodiment of the disclosure.

Referring to FIG. 3B, the block sampling module 120 would sample random test blocks 301a-304a from a test image 300A and obtain random reference blocks 301b-304b corresponding to the random test blocks 301a-304a from a reference image 300B. Next, the block sampling module 120 would obtain pixel value distributions of each of the random test blocks 301a-304a and each of the random reference blocks 301b-304b, calculate average pixel value distributions of each of the random test blocks 301a-304a and its corresponding random reference block, and then determine whether each of the average pixel value distributions is similar to the pixel distribution of the corresponding random test block or the pixel distribution of the corresponding random reference block, and thereby determine whether each of the random test blocks 301a-304a is shifted.

For example, the block sampling module 120 would determine that an average image histogram H1avg of the random test block 301a and its corresponding random reference block 301b is similar to an image histogram H1a of the random test block 301a or an image histogram H1b of the random reference block 301b, and thus would determine that the random test block 301a is not shifted. From another perspective, the distributions of the image histogram H1a and the image histogram H1b are substantially the same when there is no image shift. Hence, when the image histogram H1a and the image histogram H1b are stacked on top of each other, the distributions of the pixel values of the two blocks would substantially overlap. On the other hand, the block sampling module 120 would determine that an average image histogram H4avg of the random test block 304a and its corresponding random reference block 304b is not similar to either an image histogram H4a of the random test block 304a or an image histogram H4b of the random reference block 304b, and thus would determine that the random test block 304a is shifted.

After the block sampling module 120 determines that the random test blocks 301a and 302a are shifted and the random test blocks 303a and 304a are not shifted, it would divide the test image 300a into a shifted region 300R1 and a non-shifted region 300R2 by using a SVM classifier, where the shifted region 300R1 is a target region to be calibrated in the test image 300A.

Revisiting RIG. 2, the block sampling module 120 would use the obtained test block image and its corresponding reference block image as a basis to obtain a shift calibration parameter. However, if color shift occurs in a local region of the test block image, the calibration on the image shift would be interfered. Hence, the block comparing module 130 would identify and remove the color shift in the local region before obtain the shift calibration parameter based on the test block image and the reference block image.

To be specific, the block comparing module 130 would partition the test block image and the reference block image respectively into multiple test sub-blocks and multiple reference sub-blocks (Step S206) and compare the test sub-blocks and the reference sub-bocks so as to identify any interfering test sub-bock and any interfering reference sub-block respectively from the test sub-blocks and the reference sub-blocks (Step S208). Herein, the block sampling module 120 may matrix-partition the test block image and the reference block image into small blocks with equal sizes, where the two images include the corresponding small blocks. That is, each of the test sub-blocks has its corresponding reference sub-block, and thus the block comparing module 130 could thereby identify the sub-blocks from the reference block and the test block from the reference block and the test block that interfere image shift calibration (i.e. the aforementioned "interfering test sub-blocks" and "interfering reference sub-blocks"). The identification approach could be based on the distributions of all pixel values in the test sub-blocks and the reference sub-blocks.

When subjects in the two images are the same where one of the images is shifted, the shapes of pixel value distributions of the two images would still be similar. However, when severe color shift appears in one of the images, the pixel value distributions of local regions of the two images would be somewhat different. Accordingly, the block comparing module 130 would define the interfering test sub-blocks and the interfering reference sub-blocks based on image histograms of the test sub-blocks and reference sub-blocks.

From one perspective, the pixel value distributions of the interfering test sub-blocks are not similar to any of those of the reference sub-blocks. From another perspective, the pixel distributions of the interfering reference sub-blocks are not similar to any of those of the test sub-blocks. However, going through each of the individual test-blocks and its reference sub-blocks for comparison would be time-consuming. Hence, in the present embodiment, the block comparing module 130 would perform clustering based on the pixel value distributions of each of the sub-blocks to accelerate the identification of the interfering test sub-blocks and the interfering reference sub-blocks.

Herein, after the block comparing module 130 obtains the image histograms of each of the test sub-blocks and the reference sub-blocks (referred to as "test sub-block image histograms" and "reference sub-block image histograms" hereinafter), it would analyze features of each of the image histogram and perform clustering on the test sub-block image histograms and the reference sub-block image histograms to respectively generate multiple test groups and multiple reference groups. Next, the block comparing module 130 would set the test sub-blocks corresponding to the test groups different from any of the reference groups as the interfering test sub-blocks and set the reference sub-blocks corresponding to the reference groups different from any of the test groups as the interfering reference sub-blocks. Mathematically speaking, let Ts be a set of the test sub-blocks, and let Rs be a set of the reference sub-blocks. All the interfering sub-blocks could be written as follows:

$$Rs \Delta Ts = (Rs \cup Ts) - (Rs \cap Ts),$$

where ∪ represents union, and ∩ represents intersect, and Δ represents symmetric difference. In other words, all the interfering sub-blocks RsΔTs could only belong to one of the sets, but not belong to the two sets at the same time.

Figure 4A:
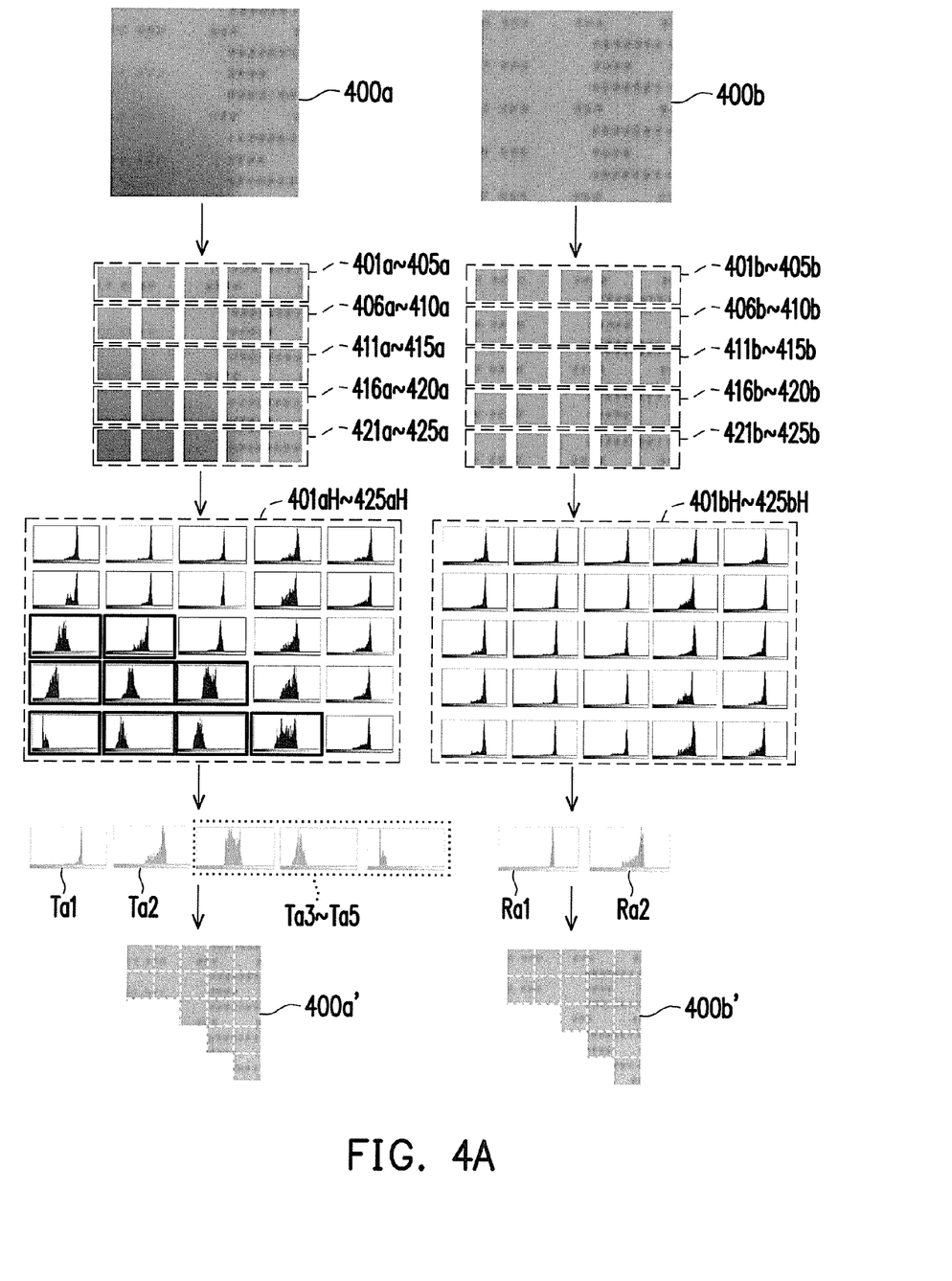
FIG. 4A illustrates a schematic diagram of a method to identify interfering test sub-blocks and interfering reference sub-blocks according to an embodiment of the disclosure.

To be specific, FIG. 4A illustrates a schematic diagram of a method to identify interfering test sub-blocks and interfering reference sub-blocks according to an embodiment of the disclosure.

Referring to FIG. 4A, the block comparing module 130 would partition a test block image 400a and a reference block image 400b respectively into test sub-blocks 401a-425a and reference sub-blocks 401b-425b, and obtain image histograms of the test sub-blocks 401a-425a and the reference sub-blocks 401b-425b (referred to as "test sub-block image histograms" 401aH-425aH and "reference sub-blocks image histograms" 401bH-425bH). Next, the block comparing module 130 would analyze features of the image histograms and further perform clustering on the test sub-block image histograms 401aH-425aH and the reference sub-block image histograms 401bH-425bH based on similarity. In the present embodiment, the test sub-block image histograms 401aH-425aH could be clustered into five groups, i.e. test groups Ta1-Ta5; the reference sub-block image histograms 401bH-425bH could be clustered into two groups, i.e. reference groups Rb1 and Rb2.

The block comparing module 130 would determine that the test groups Ta3, Ta4, and Ta5 are not similar to the group Rb1 and Rb2 clustered from the reference sub-block image histograms 301bH-325bH. Hence, the block comparing module 130 would set the test sub-blocks 411a-412a, 416a-418a, and 421a-424a corresponding to the test groups Ta3, Ta4, and Ta5 as interfering test sub-blocks. On the other hand, no interfering reference sub-block exists in the present embodiment.

Revisiting FIG. 2, after the block comparing module 130 identifies all of the interfering test sub-blocks and the interfering reference sub-blocks, the block filtering module 140 would filter out the interfering test sub-blocks and the test sub-blocks corresponding to the interfering reference sub-blocks from the test block image to generate a filtered test block image as well as filter out the interfering reference sub-blocks and the reference sub-blocks corresponding to the interfering test sub-blocks from the reference block image to generate a filtered reference block image (Step S210). To be specific, in terms of the test block image, the block filtering module 140 would not only filter out all the identified interfering test sub-blocks, but would also filter out the test sub-blocks in the test block image that correspond to the interfering reference sub-blocks. Similarly, in terms of the reference block image, the block filtering module 140 would not only filter out all the identified interfering reference sub-blocks, but would also filter out the reference sub-blocks in the reference block image that correspond to the interfering test sub-blocks. Hence, after the block filtering module 140 performs filtering on the test block image and the reference block image, only the sub-blocks able to be used for image shift comparison in the follow-up steps would be preserved in the filtered test block image and the filtered reference block image.

As an example illustrated in FIG. 4A, after the block comparing module 130 sets the test sub-blocks 411a-412a, 416a-418a, and 421a-424a as the interfering test sub-blocks, the block filtering module 140 would filter out the interfering test sub-blocks in the test block image 400a and the reference sub-blocks 411a-412b, 416b-418b, and 421b-424b corresponding to the interfering test sub-blocks in the reference block image 400b so as to respectively generate a filtered test block image 400a' and a filtered reference block image 400b'.

Next, the image calibrating module 150 would obtain a shift calibration parameter according to the filtered test block image and the filtered reference block image by leveraging a feature-based image matching algorithm (Step S212) and calibrate the test block in the test image according to the shift calibration parameter to obtain a calibrated test block image (Step S214). To be specific, the image calibrating module 150 may align the filtered test block image to the filtered reference block image according to the feature matching result. A value that compensates the filtered test block image so as to allow the image calibrating module 150 to stack the two images on top of each other is the aforementioned shifted calibration parameter. In other words, the shift calibration parameter obtained by the image calibration module 150 is a shift value of the filtered test block image with respect to the filtered reference block image. Next, the image calibrating module 150 would further calibrate the test block by using the shift calibration parameter.

In an embodiment, before the image calibrating module 150 performs calibration, it would perform blurring processing and binarization on the filtered test block image and the filtered reference block image to obtain a more precise shift calibration parameter.

To be specific, the image calibrating module 150 may perform blurring processing on the filtered test block image and the filtered reference block image to reduce image noise and level of detail as well as preserve distributive features of an entire image. In the present embodiment, the image calibrating module 150 may perform blurring processing by using a low-pass filter such as a Gaussian blur filter, and yet the disclosure is not limited in this regard. The blurred filtered test block image and the blurred filtered reference block image are referred to as "a blurred test block image" and "a blurred reference block image" hereinafter.

Next, the image calibrating module 150 may further perform binarization on the filtered test block image and the filtered reference block image to eliminate noise unnecessarily to be examined and thereby accelerate the feature matching process. The binarized filtered test block image and the binarized filtered reference block image are referred to as "a binarized test block image" and "a binarized reference block image". Accordingly, the image calibrating module 150 may obtain the shift calibration parameter by using the binarized test block image and the binarized reference block image. The approach to obtain the shift calibration parameter according to the two images may refer to the related description in the previous paragraphs and would not be repeated herein.

In the present embodiment, after the image calibrating module 150 obtains the calibrated test block image, the defect inspecting module 160 would compare the calibrated test block image and the reference block image to obtain defect information of the test item corresponding to the test block (Step S216). The defect inspecting module 160 would determine whether the calibrated test block image and the reference block image is different by leveraging any matching approach so as to inspect the defects of the test item. For example, the defect inspecting module 160 could determine whether a difference between each pixel in the calibrated test block image and its corresponding pixel in the reference block image is greater than an inspection threshold. If yes, it indicates that the corresponding pixel is a defect signal, and the defect inspecting module 160 would determine that there exist defects in the test block of the test item. Moreover, the defect inspecting module 160 may further locate the defect in the test block of the test item by using image coordinates according to the pixels in the calibrated test block image that are different to their corresponding pixels in the reference block image.

It should be noted that, although the aforementioned inspection process is only performed on the test block in the test image, it is also adapted to other test blocks in the to-be-calibrated region in the test image to complete the calibration of the entire test image. The calibration method for the other test blocks and the defect locating method may refer to the related description in the previous paragraphs and would not be repeated herein. However, in another embodiment, the image calibrating module 150 could calibrate the entire to-be-calibrate region including multiple test blocks by using the shift calibration parameter of a single test block so as to accelerate the calibration process. To be specific, the image calibrating module 150 could estimate the shift calibration parameter by using the block sampled from the shifted region by the block sampling module 120 and perform shift calibration on the shifted region in the entire image.

In an embodiment, since image shift often comes with uneven color and brightness, after the image calibrating module 150 calibrates the to-be-calibrated region in the test image according to the shift calibration parameter, it would further perform color and brightness calibration on the calibrated test image. One of the block images would be illustrated hereafter, and other block images could be deduced in a similar fashion.

To be specific, assume that the test block in the test image is calibrated to generate a shift-calibrated test block image. The image calibrating module 150 may first perform blurring processing on the shift-calibrated test block image and the reference bock image to respectively generate a blurred shift-calibrated test block image and a blurred reference block image so as to reduce noises in the images. Herein, the image calibrating module 150 may also perform blurring processing by using a low-pass filter such as a Gaussian blurring filter, and yet the disclosure is not limited in this regard.

Next, the image calibrating module 150 may perform color and brightness calibration on the blurred shift-calibrated test block image based on differences between pixel values of the blurred shift-calibrated test block image and those of the blurred reference block image. Mathematically speaking, assume that the shift-calibrated test block image and the blurred shift-calibrated test block image are respectively denoted as Ts and Tsb, and the blurred reference block image is denoted as Rb. Then, (Tsb−Rb) would represent a color and brightness calibration parameter, and the blurred shift-calibrated test block image after color and brightness calibration may be denoted as Ts+(Tsb−Rb). In the present embodiment, the image calibrating module 150 would set the blurred shift-calibrated test block image after color and brightness calibration as the calibrated test block image, and the defect inspecting module 160 would compare the calibrated test block image and the reference block image to inspect the defect in the test block of the test item.

Figure 4B:
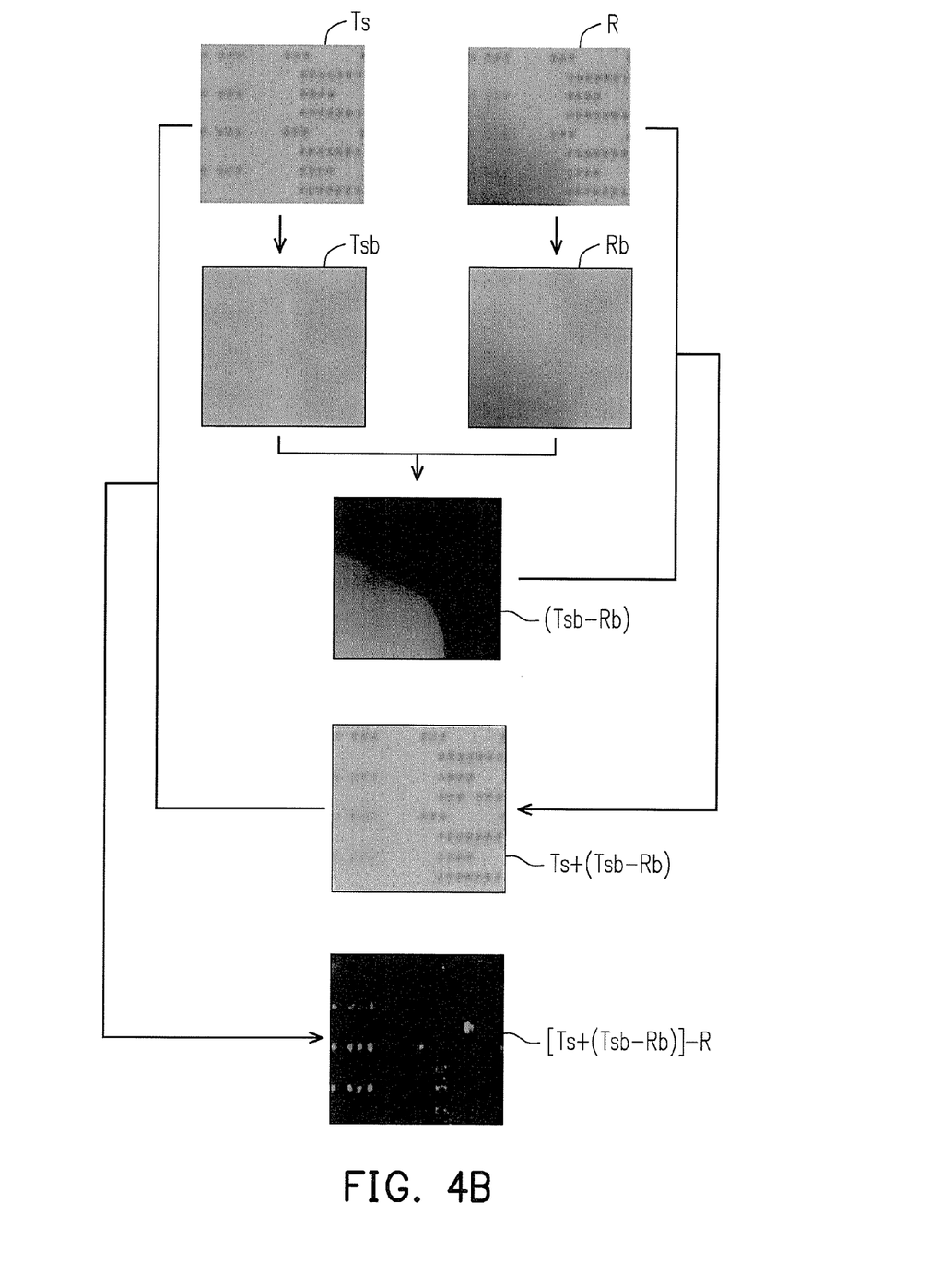
FIG. 4B illustrates a flowchart of inspecting defects in a test item according to an embodiment of the disclosure.

To be specific, FIG. 4B illustrates a flowchart of inspecting defects in a test item according to an embodiment of the disclosure, where the flow continues after a to-be-calibrated region of a test image is calibrated by a shift calibration parameter.

Referring to FIG. 4B, after the image calibrating module 150 obtains a shift-calibrated test block image Ts, the image calibrating module 150 would perform blurring processing on the shift-calibrated test block image Ts and a reference block image R to respectively generate a filtered shift-calibrated test block image Tsb and a filtered reference block image Rb so as to reduce noises in the image. Next, the image calibrating module 150 would perform color and brightness calibration on the filtered shift-calibrated test block image by using differences (Tsb−Rb) between pixel values of the blurred shift-calibrated test block image Tsb and those of the filtered reference block image Rb and thereby obtain a color-brightness-calibrated blurred shift-calibrated test block image Ts+(Tsb−Rb); that is, the aforementioned calibrated test block image. In this example, the defect inspecting module 160 would calibrate a difference between the calibrated test block image Ts+(Tsb−Rb) and the reference block image R and thereby obtain a difference image [Ts+(Tsb−Rb)]−R. Next, the defect inspecting module 160 would determine that the pixels in the difference image [Ts+(Tsb−Rb)]−R with pixel values being greater than the inspection threshold are defect signals and thereby locate defects in the test item.

Figure 5:
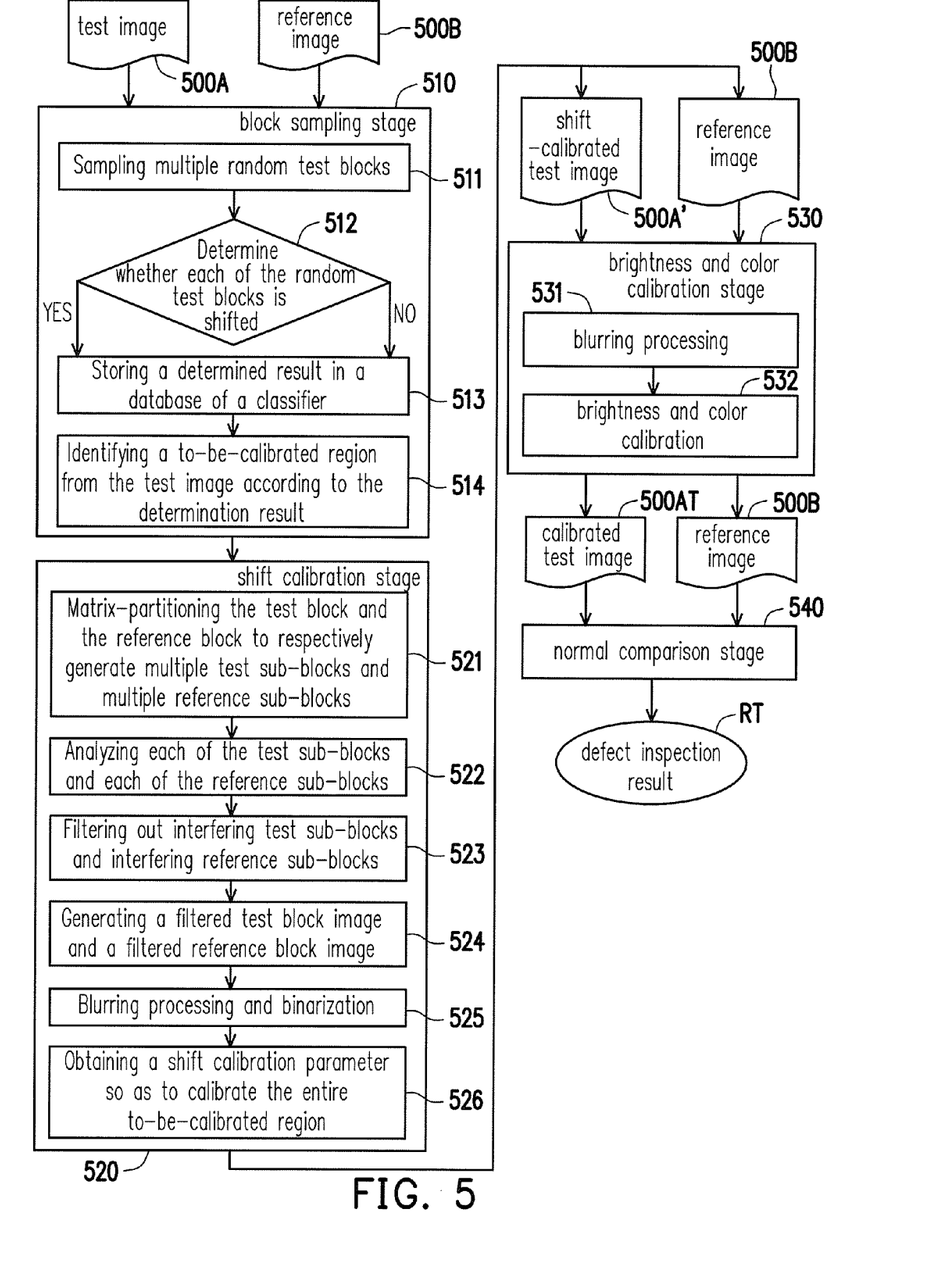
FIG. 5 illustrates a function block diagram of an item defect inspection method according to an embodiment of the disclosure.

The aforementioned item defect inspection method could be summarized by a functional block diagram as illustrated in FIG. 5 according to an embodiment of the disclosure.

Referring to FIG. 5, after a test image 500A and a reference image 500B are received, the method could include the following four stages: a block sampling stage 510, a shift calibration stage 520, a brightness and color calibration stage 530, and a normal comparison stage 540.

In the block sampling stage 510, multiple random test blocks are sampled from the test image 500A (511) and whether each of the random test blocks is shifted is determined (512). The block sampling module 120 would not only store a determination result in a database of a classifier (513) to train the classifier, but would also identify a to-be-calibrated region from the test image 500A according to the determination result (514).

In the shift calibration stage 520, a test block would be sampled from a test region of the test image 500A and its corresponding reference block would be obtained from the reference image 500B. Matrix-partition would be performed on the test block and the reference block to respectively generate multiple test sub-blocks and multiple reference sub-blocks (521). Next, each of the test sub-blocks and the reference sub-blocks would be analyzed (522) to filter out interfering test sub-blocks and interfering reference sub-blocks (523), and a filtered test block image and a filtered reference block image would be generated (524). Blurring processing and binarization would be next performed on the filtered test block image and the filtered reference block image (525), and a shift calibration parameter would be obtained by using image alignment so as to calibrate all test blocks in the to-be-calibrated region (526). Thus, a shift-calibrated test image 500A' would be generated in a more efficient fashion.

In the brightness and color calibration stage 530, blurring processing (531) followed by brightness and color calibration (532) would be performed on the shift calibration test image 500A' and the reference image 500B to generate a calibrated test image 500AT.

Lastly, in the normal comparison stage 540, all blocks in the calibrated test image 500AT would be compared with their corresponding blocks in the reference image 500B to inspect any defect in the test item, and a defect inspection result RT would be outputted.

The disclosure further provides a non-transitory computer-readable recording medium, which can be used to execute the steps of the aforementioned item defect inspection method. The computer program is composed of a plurality of program instructions (for example, an organization chart establishing program instruction, a table approving program instruction, a setting program instruction, and a deployment program instruction, etc). After these program instructions are loaded into an image processing system and executed by the same, the steps of the item defect inspection method described above may be completed.

In summary, in the proposed item defect inspection method, image processing system and computer-readable recording medium using the same, before a test image and a reference image are compared, image shift calibration as well as brightness and color compensation would be performed on a local region in the test image so as to reduce the probability of a false alarm on item defect inspection.

In summary, a method, an image processing system, and a computer-readable recording medium for item defect inspection proposed in the disclosure would calibrate a shifted region in a test image before the test image is compared with its reference image so as to reduce the probability of a false alarm on item defect inspection.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An item defect inspection method, adapted to an image processing system, comprising the following steps:
    receiving a test image and a reference image of a test item;
    obtaining a test block from the test image and obtaining a reference block corresponding to the test block from the reference image to respectively generate a test block image and a reference block image;
    partitioning the test block image and the reference block image respectively into a plurality of test sub-blocks and a plurality of reference sub-blocks, wherein each of the test sub-blocks corresponds to each of the reference sub-block;
    comparing the test sub-blocks and the reference sub-blocks so as to identify any interfering test sub-bock and any interfering reference sub-block respectively from the test sub-blocks and the reference sub-blocks, wherein each of the interfering test sub-blocks is not similar to any of the interfering reference sub-blocks, and wherein each of the interfering reference sub-blocks is not similar to any of the interfering test sub-blocks;
    filtering out the interfering test sub-blocks and the test sub-blocks corresponding to the interfering reference sub-blocks from the test block image to generate a filtered test block image, and filtering out the interfering reference sub-blocks and the reference sub-blocks corresponding to the interfering test sub-blocks from the reference block image to generate a filtered reference block image;

obtaining a shift calibration parameter according to the filtered test block image and the filtered reference block image;

calibrating the test block in the test image according to the shift calibration parameter to obtain a calibrated test block image; and comparing the calibrated test block image and the reference block image to obtain defect information of the test item corresponding to the test block.

2. The item defect inspection method according to claim 1, wherein the step of comparing the test sub-blocks and the reference sub-blocks so as to identify the interfering test sub-bocks and the interfering reference sub-blocks respectively from the test sub-blocks and the reference sub-blocks comprises:

obtaining a pixel value distribution of each of the test sub-blocks and a pixel value distribution of each of the reference sub-blocks to respectively generate a plurality of test sub-block image histograms and a plurality of reference sub-block image histograms;

analyzing features of the test sub-block image histograms and the reference sub-block image histograms to cluster the sub-block image histograms and the reference sub-block image histograms respectively into a plurality of test groups and a plurality of reference groups; and setting the test sub-blocks corresponding to the test groups different from any of the reference groups as the interfering test sub-blocks, and setting the reference sub-blocks corresponding to the reference groups different from any of the test groups as the interfering reference sub-blocks.

3. The item defect inspection method according to claim 1, wherein the step of obtaining the shift calibration parameter according to the filtered test block image and the filtered reference block image further comprises:

performing blurring processing on the filtered test block image and the filtered reference block image to respectively generate a blurred filtered test block image and a blurred filtered reference block image;

performing binarization on the blurred filtered test block image and the blurred filtered reference block image to generate a binarized filtered test block image and a binarized filtered reference block image; and obtaining the shift calibration parameter according to the binarized filtered test block image and the binarized filtered reference block image by leveraging an image feature matching algorithm.

4. The item defect inspection method according to claim 1, wherein the step of obtaining the test block from the test image comprises:

sampling a plurality of random test blocks from the test image; and determining whether each of the random test blocks is shifted so as to accordingly identify a to-be-calibrated region from the test image, wherein the to-be-calibrated region comprises a plurality of to-be-tested blocks; and setting each of the to-be-tested blocks as the test block.

5. The item defect inspection method according to claim 4, wherein the step of determining whether each of the random test blocks is shifted comprises:

obtaining a plurality of random reference blocks corresponding to the random test blocks from the reference image;

for each of the random test blocks:

obtaining an average image histogram of the random test block and the corresponding random reference block thereof;

determining whether the average image histogram is similar to an image histogram of the random test block or an image histogram of the random reference block;

if yes, determining that the random test block is not shifted; and if no, determining that the random test block is shifted.

6. The item defect inspection method according to claim 4, wherein the step of identifying the to-be-calibrated region from the test image comprises:

identifying a shifted region and a non-shifted region from the test image by using a classifier according to a determination result of whether each of the random test blocks is shifted; and setting the shifted region as the to-be-calibrated region.

7. The item defect inspection method according to claim 4, wherein after the step of determining whether each of the random test blocks is shifted, the item defect inspection method further comprises:

training a classifier by using a determination result of whether each of the random test blocks is shifted.

8. The item defect inspection method according to claim 1, wherein the step of obtaining the test block from the test image comprises:

iterating the test image to obtain the test block.

9. The item defect inspection method according to claim 1, wherein the step of calibrating the test block in the test image according to the shift calibration parameter to obtain the calibrated test block image further comprises:

calibrating the test block in the test image according to the shift calibration parameter to generate a shift-calibrated test block image;

performing blurring processing on the shift-calibrated test block image and the reference block image to respectively generate a blurred shift-calibrated test block image and a blurred reference block image; and performing color and brightness calibration on the blurred shift-calibrated test block by using differences between a plurality of pixel values of the blurred shift-calibrated test block image and a plurality of pixel values of the blurred reference block image to generate a calibrated test block image.

10. The item defect inspection method according to claim 1, wherein the test image is an image captured from the test item, and the reference image is an image of the test item substantially with no defect.

11. An image processing system comprising:

a storage device, recording a plurality of modules; and at least one processor, coupled to the storage device, accessing and executing the modules recorded in the storage device, wherein the modules comprise:

an image receiving module, receiving a test image and a reference image of a test item;

a block sampling module, obtaining a test block from the test image and obtaining a reference block corresponding to the test block from the reference image to respectively generate a test block image and a reference block image;

a block comparing module, partitioning the test block image and the reference block image respectively into a plurality of test sub-blocks and a plurality of reference sub-blocks, and comparing the test sub-blocks and the reference sub-blocks so as to identify any interfering test sub-bock and any interfering reference sub-block respectively from the test sub-blocks and the reference sub-blocks, wherein each of the test sub-blocks corresponds to each of the reference sub-block, wherein each of the interfering test sub-blocks is not similar to any of the interfering reference sub-blocks, and wherein each of the interfering reference sub-blocks is not similar to any of the interfering test sub-blocks;

a block filtering module, filtering out the interfering test sub-blocks and the test sub-blocks corresponding to the interfering reference sub-blocks from the test block image to generate a filtered test block image, and filtering out the interfering reference sub-blocks and the reference sub-blocks corresponding to the interfering test sub-blocks from the reference block image to generate a filtered reference block image;

an image calibrating module, obtaining a shift calibration parameter according to the filtered test block image and the filtered reference block image, and calibrating the test block in the test image according to the shift calibration parameter to obtain a calibrated test block image; and a defect inspecting module, comparing the calibrated test block image and the reference block image to obtain defect information of the test item corresponding to the test block.

12. The image processing system according to claim 11, wherein the block comparing module obtains a pixel value distribution of each of the test sub-blocks and a pixel value distribution of each of the reference sub-blocks to respectively generate a plurality of test sub-block image histograms and a plurality of reference sub-block image histograms, analyzes features of the test sub-block image histograms and the reference sub-block image histograms to cluster the sub-block image histograms and the reference sub-block image histograms respectively into a plurality of test groups and a plurality of reference groups, sets the test sub-blocks corresponding to the test groups different from any of the reference groups as the interfering test sub-blocks, and sets the reference sub-blocks corresponding to the reference groups different from any of the test groups as the interfering reference sub-blocks.

13. The image processing system according to claim 11, wherein the image calibrating module performs blurring processing on the filtered test block image and the filtered reference block image to respectively generate a blurred filtered test block image and a blurred filtered reference block image, performs binarization on the blurred filtered test block image and the blurred filtered reference block image to generate a binarized filtered test block image and a binarized filtered reference block image, and obtains the shift calibration parameter according to the binarized filtered test block image and the binarized filtered reference block image by leveraging an image feature matching algorithm.

14. The image processing system according to claim 11, wherein the block sampling module further samples a plurality of random test blocks from the test image, determines whether each of the random test blocks is shifted so as to accordingly identify a to-be-calibrated region comprising a plurality of to-be-tested blocks from the test image, and sets each of the to-be-tested blocks as the test block.

15. The image processing system according to claim 14, wherein the block sampling module obtains a plurality of random reference blocks corresponding to the random test blocks from the reference image, and wherein for each of the random test blocks:

the block sampling module obtains an average image histogram of the random test block and the corresponding random reference block thereof, and determines whether the average image histogram is similar to an image histogram of the random test block or an image histogram of the random reference block;

if yes, the block sampling module determines that the random test block is not shifted; and if no, the block sampling module determines that the random test block is shifted.

16. The image processing system according to claim 14, wherein the block sampling module identifies a shifted region and a non-shifted region from the test image by using a classifier according to a determination result of whether each of the random test blocks is shifted and sets the shifted region as the to-be-calibrated region.

17. The image processing system according to claim 14, wherein the block sampling module further trains a classifier by using a determination result of whether each of the random test blocks is shifted.

18. The image processing system according to claim 11, wherein the block sampling module iterates the test image to obtain the test block.

19. The image processing system according to claim 11, wherein the image calibrating module further calibrates the test block in the test image according to the shift calibration parameter to generate a shift-calibrated test block image, performs blurring processing on the shift-calibrated test block image and the reference block image to respectively generate a blurred shift-calibrated test block image and a blurred reference block image, and performs color and brightness calibration on the blurred shift-calibrated test block by using differences between a plurality of pixel values of the blurred shift-calibrated test block image and a plurality of pixel values of the blurred reference block image to generate a calibrated test block image.

20. A non-transitory computer-readable recording medium, storing computer program to be loaded into an image processing system to perform steps of:

receiving a test image and a reference image of a test item;

obtaining a test block from the test image and obtaining a reference block corresponding to the test block from the reference image to respectively generate a test block image and a reference block image;

partitioning the test block image and the reference block image respectively into a plurality of test sub-blocks and a plurality of reference sub-blocks, wherein each of the test sub-blocks corresponds to each of the reference sub-block;

comparing the test sub-blocks and the reference sub-blocks so as to identify any interfering test sub-bock and any interfering reference sub-block respectively from the test sub-blocks and the reference sub-blocks, wherein each of the interfering test sub-blocks is not similar to any of the interfering reference sub-blocks, and each of the interfering reference sub-blocks is not similar to any of the interfering test sub-blocks;

filtering out the interfering test sub-blocks and the test sub-blocks corresponding to the interfering reference sub-blocks from the test block image to generate a filtered test block image, and filtering out the interfering reference sub-blocks and the reference sub-blocks corresponding to the interfering test sub-blocks from the reference block image to generate a filtered reference block image;

obtaining a shift calibration parameter according to the filtered test block image and the filtered reference block image;

calibrating the test block in the test image according to the shift calibration parameter to obtain a calibrated test block image; and comparing the calibrated test block image and the reference block image to obtain defect information of the test item corresponding to the test block.

\* \* \* \* \*